United States Patent
Shiibayashi et al.

(10) Patent No.: US 8,628,306 B2
(45) Date of Patent: Jan. 14, 2014

(54) HELIUM ENCLOSED COMPRESSOR

(75) Inventors: Masao Shiibayashi, Shizuoka (JP); Takao Mizuno, Shizuoka (JP)

(73) Assignee: Hitachi Appliances, Inc., Tokyo (JP)

(*) Notice: Subject to any disclaimer, the term of this patent is extended or adjusted under 35 U.S.C. 154(b) by 0 days.

(21) Appl. No.: 13/471,893

(22) Filed: May 15, 2012

(65) Prior Publication Data

US 2012/0224990 A1 Sep. 6, 2012

Related U.S. Application Data

(63) Continuation of application No. 12/397,665, filed on Mar. 4, 2009.

(51) Int. Cl.
*F04C 18/00* (2006.01)

(52) U.S. Cl.
USPC ........................ 417/410.5; 418/55.1

(58) Field of Classification Search
USPC .............................. 417/410.5; 418/55.1–55.5
See application file for complete search history.

(56) References Cited

U.S. PATENT DOCUMENTS

| | | | |
|---|---|---|---|
| 4,818,195 A * | 4/1989 | Murayama et al. | 418/15 |
| 5,125,810 A * | 6/1992 | Suefuji et al. | 418/55.2 |
| 2002/0051719 A1* | 5/2002 | Shiibayashi et al. | 418/55.2 |
| 2004/0245010 A1* | 12/2004 | Banks et al. | 174/120 R |

FOREIGN PATENT DOCUMENTS

| | | |
|---|---|---|
| JP | 2006-029251 | 2/2006 |
| JP | 2006029251 A * | 2/2006 |

* cited by examiner

*Primary Examiner* — Peter J Bertheaud
*Assistant Examiner* — Dominick L Plakkoottam
(74) *Attorney, Agent, or Firm* — Antonelli, Terry, Stout & Kraus, LLP.

(57) ABSTRACT

Helium enclosed compressor. A compressor and a motor section with stator having coil ends and a rotor, are housed within an enclosed vessel partitioned into discharge and motor chambers by a frame. The compressor section has a stationary scroll having a spiral wrap standing upright at a disk-like panel and an orbiting scroll having a spiral wrap standing upright at a disk-like panel, made to mesh with each other while their wraps face the inside. The orbiting scroll sucks helium gas from a suction port of an outer peripheral portion of the stationary scroll, and discharges helium gas into the discharge chamber from a discharge port of a central portion of the stationary scroll. An inverter controls a number of rotations of the motor section, wherein a plurality of varnish-treated layers which becomes insulating films is formed on the surface of a coil which constitutes the coil ends.

3 Claims, 7 Drawing Sheets

HELIUM ENCLOSED COMPRESSOR

CROSS REFERENCE TO RELATED APPLICATION

This is a continuation of U.S. application Ser. No. 12/397,665, filed Mar. 4, 2009. This application relates to and claims priority from Japanese Patent Application No. 2006-230085, filed on Aug. 28, 2006. The entirety of the contents and subject matter of all of the above is incorporated herein by reference.

BACKGROUND OF THE INVENTION

The present invention relates to a helium enclosed compressor, and particularly, to one suitable for a helium enclosed compressor in which a motor section having coil ends is housed within an enclosed vessel filled with a helium gas.

In a conventional helium enclosed compressor, a helium gas is used as a working gas, a compressor section and a motor section are arranged vertically and housed within an enclosed vessel, the inside of the enclosed vessel is partitioned into a discharge chamber and a motor chamber by a frame, a first rectangular passage which allows the discharge chamber to communicate with the motor chamber is provided between an outer peripheral surface of the frame and an inner wall surface of the enclosed vessel, and a second passage which allows an upper motor chamber to communicate with a lower motor chamber is provided between an outer peripheral surface of the stator and the inner wall surface of the enclosed vessel. Also, the compressor section is adapted such that a stationary scroll and an orbiting scroll are made to mesh with each other while their wraps face the inside, and the orbiting scroll is made to orbit, thereby sucking the helium gas from a suction port of an outer peripheral portion of the stationary scroll, and discharging the helium gas into the motor chamber through the inside of the discharge chamber from a discharge port of a central portion of the stationary scroll. Additionally, the helium enclosed compressor includes an oil injection mechanism section which connects an oil injection pipe for cooling the helium gas to an oil injection port provided in the panel of the stationary scroll through the enclosed vessel, and an inverter which controls the number of rotations of the motor section.

As a document relevant to the helium enclosed compressor, for example, JP-A-2006-29251 is mentioned.

In the helium scroll compressor, the peripheries of the coil ends are full of a helium gas. Therefore, it turned out that there are problems inherent in helium applications that corona discharge occurs easily in a helium gas atmosphere, and thereby, the insulating property of the motor coil ends deteriorates. Particularly when the number of rotations of the motor section is controlled by an inverter, a high voltage surge voltage is generated on the side of the inverter, and the high surge voltage acts on the coil ends. Therefore, the corona discharge occurs easily.

However, in the conventional helium scroll compressor, a varnish-treated layer formed on the surface of a coil which constitutes the coil ends was a monolayer, and it could not be said that prevention of a corona discharge was fully considered.

DISCLOSURE OF THE INVENTION

The object of the invention is to obtain a helium enclosed compressor capable of preventing insulation breakdown of coil ends by corona discharge to improve reliability.

In order to achieve the aforementioned object, a first aspect of the invention is a helium enclosed compressor in which a helium gas is used as a working gas, a compressor section and a motor section including a stator having coil ends, and a rotor is housed within an enclosed vessel, and the helium gas, which has been discharged into the enclosed vessel from a discharge port of the compressor section, is discharged to the outside of the enclosed vessel through the coil ends. Here, a plurality of varnish-treated layers which becomes insulating films is formed on the surface of a coil which constitutes the coil ends.

Additionally, a second aspect of the invention is a helium enclosed compressor in which a helium gas is used as a working gas, a compressor section, and a motor section including a stator having coil ends and a rotor are arranged vertically and housed within an enclosed vessel, the inside of the enclosed vessel is partitioned into a discharge chamber and a motor chamber by a frame, a first rectangular passage which allows the discharge chamber to communicate with the motor chamber is provided between an outer peripheral surface of the frame and an inner wall of the enclosed vessel, a second passage which allows an upper motor chamber in an upper portion of the stator to communicate with a lower motor chamber having an oil reservoir at a bottom of a lower portion of the stator is provided between an outer peripheral surface of the stator and the inner wall of the enclosed vessel, the compressor section is adapted such that a stationary scroll having a spiral wrap standing upright at a disk-like panel and an orbiting scroll having a spiral wrap standing upright at a disk-like panel are made to mesh with each other while their wraps face the inside, and the orbiting scroll is made to orbit, thereby sucking the helium gas from the suction port of an outer peripheral portion, and discharging the helium gas into the discharge chamber from a discharge port of a central portion of the stationary scroll, and an oil injection mechanism section is provided to connect an oil injection pipe for cooling the helium gas to an oil injection port provided in the panel of the stationary scroll through the enclosed vessel. Here, a plurality of varnish-treated layers which becomes insulated films is formed on the surface of a coil which constitutes the coil ends, and the external diameter of the coil end on the downstream side of the first passage is increased to increase the coil density of the coil ends, and the gap dimension between outer peripheries of the coil ends and the inner wall of the enclosed vessel is made smaller than the height of an opening of the first passage.

In the first and second aspects of the invention as described above, if the invention is applied to one including an inverter which controls the number of rotations of the motor section, a large effect is obtained. More preferably, an enamel-coated coil is used as the coil which constitutes the coil ends, and an epoxy-based varnish material is used for the varnish-treated layers.

A third aspect of the invention is a helium enclosed compressor in which a helium gas is used as a working gas, a compressor section, and a motor section including a stator having coil ends and a rotor are housed within an enclosed vessel, the inside of the enclosed vessel is partitioned into a discharge chamber and a motor chamber by a frame, the compressor section is adapted such that a stationary scroll having a spiral wrap standing upright at a disk-like panel and an orbiting scroll having a spiral wrap standing upright at a disk-like panel are made to mesh with each other while their wraps face the inside, and the orbiting scroll is made to orbit, thereby sucking the helium gas from a suction port of an outer peripheral portion of the stationary scroll, and discharging the helium gas into the discharge chamber from a discharge port of a central portion of the stationary scroll, and an inverter is provided to control the number of rotations of the motor section. Here, a plurality of varnish-treated layers which becomes insulating films is formed on the surface of a coil which constitutes the coil ends.

In a more preferable concrete configuration of the third aspect of the invention as described above, the operating pressure within the enclosed vessel is set to a range of 1.5 MPaG to 3.0 MPaG.

More preferable concrete configurations in the second and third aspects of the invention described above are as follows.

That is, the stator has a stator core and the coil ends which protrude on both sides of the stator core, a core cut portion is formed in the outer peripheral surface of the stator core so that a passage which allows an upper portion and a lower portion of the stator core to communicate with each other is provided between an outer peripheral surface of the stator core and the inner wall surface of the enclosed vessel, and the external diameter of the coil ends is increased to an external diameter almost equal to the external diameter of the stator core in the core cut portion, thereby increasing the coil density of the coil ends.

According to the helium enclosed compressor of the invention described above, it is possible to prevent insulation breakdown of coil ends by corona discharge to improve reliability.

Other features, objects, and advantages of the invention will become more apparent on reading the following description with reference to the accompanying drawings.

DETAILED DESCRIPTION OF THE INVENTION

Hereinafter, a plurality of embodiments of the invention will be described with reference to the drawings. The same reference numerals in the drawings of each embodiment represent the same objects or equivalents.

(First Embodiment)

A helium scroll compressor of a first embodiment of the invention will be described with reference to FIGS. 1 to 7.

Figure 1:
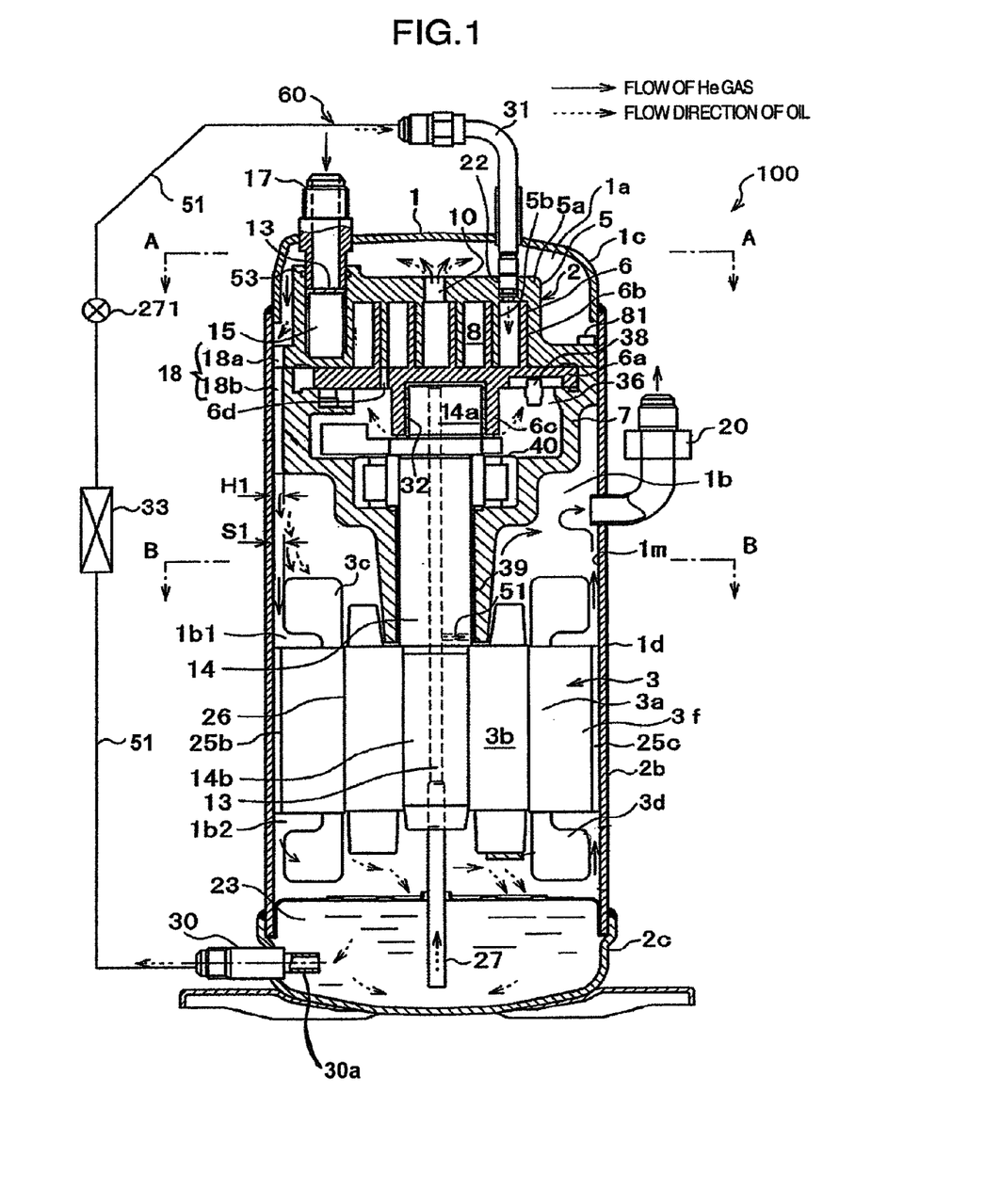
FIG. 1 is a longitudinal sectional view of a helium enclosed scroll compressor of a first embodiment of the invention.

First, referring to FIG. 1, the basic configuration of a helium enclosed scroll compressor 100 of this embodiment will be described. FIG. 1 is a longitudinal sectional view of the helium enclosed scroll compressor 100 of the first embodiment of the invention.

The helium enclosed scroll compressor 100 uses a helium gas as a working gas, and includes a compressor section 2 and a motor section 3 which are located vertically within an enclosed vessel 1 and housed juncturally by a rotary shaft 14, and an oil injection mechanism section 60 which injects lubricating oil 23 stored at the bottom of the enclosed vessel 1 into a compression chamber 8 of the compressor section 2.

The compressor section 2 has a stationary scroll 5 having a spiral wrap 5b standing upright at a panel 5a, and an orbiting scroll 6 having a spiral wrap 6b standing upright at an panel 6a. The wraps 5b and 6b are made to mesh with each other while they face the inside, the orbiting scroll 6 is engaged with an eccentric shaft 14a connected to a rotary shaft 14, and the orbiting scroll 6 is made to orbit with respect to the stationary scroll 5 without rotating. The stationary scroll 5 is provided with a discharge port 10 which opens to a central portion, and a suction port 15 which opens to an outer peripheral portion. By the orbiting motion of the orbiting scroll 6, the compressor section 2 sucks a working gas from the suction port 15 by the orbiting scroll 6, moves the working gas about the compression chamber 8 formed by the stationary scroll 5 and the orbiting scroll 6 to reduce volume to compress the working gas, and discharges the compressed working gas into a discharge chamber 1a in an upper portion of the compressor section 2 from the discharge port 10.

The motor section 3 includes a stator 3a which forms a plurality of arched passages (second passages) 25a to 25d (refer to FIG. 3) between the motor section and the enclosed vessel 1, and a rotor 3b which is rotatably provided inside the stator 3a. The stator 3a has a stator core 3f, and coil ends 3c and 3d which protrude up and down from the stator core 3f. The plurality of arched passages 25a to 25d is provided by forming a plurality of core cut portions 3q to 3t at an outer peripheral surface of the stator core 3f.

Also, the helium enclosed scroll compressor 100 is adapted to guide the working gas discharged along with injection oil to an upper motor chamber 1b1 of a motor chamber 1b in a lower portion of the compressor section 2 through a rectangular passage (first passage) 18 formed between the compressor section 2 and the enclosed vessel 1, to guide the working gas to a lower motor chamber 1b2 in a lower portion of the motor section 3 through an arched passage 25b formed between the stator core 3a and the enclosed vessel 1, to guide the working gas to the upper motor chamber 1b1 in an upper portion of the motor section 3 through another arched passage 25c formed between the stator core 3a and the enclosed vessel 1, and to discharge the working gas to the outside through a discharge pipe 20. The discharge pipe 20 is located and provided opposite the rectangular passage 18. The arched passage 25b is provided to face a vertical direction directly under the rectangular passage 18.

Figure 2:
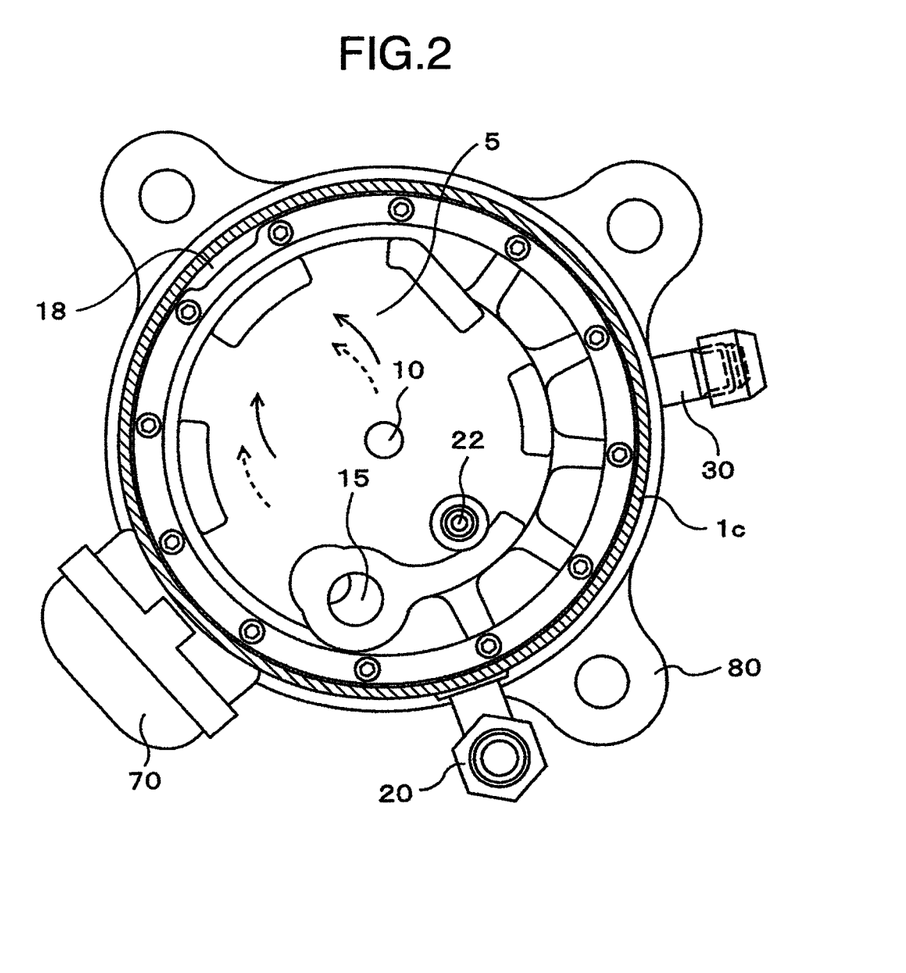
FIG. 2 is an A-A sectional view of FIG. 1.
Figure 3:
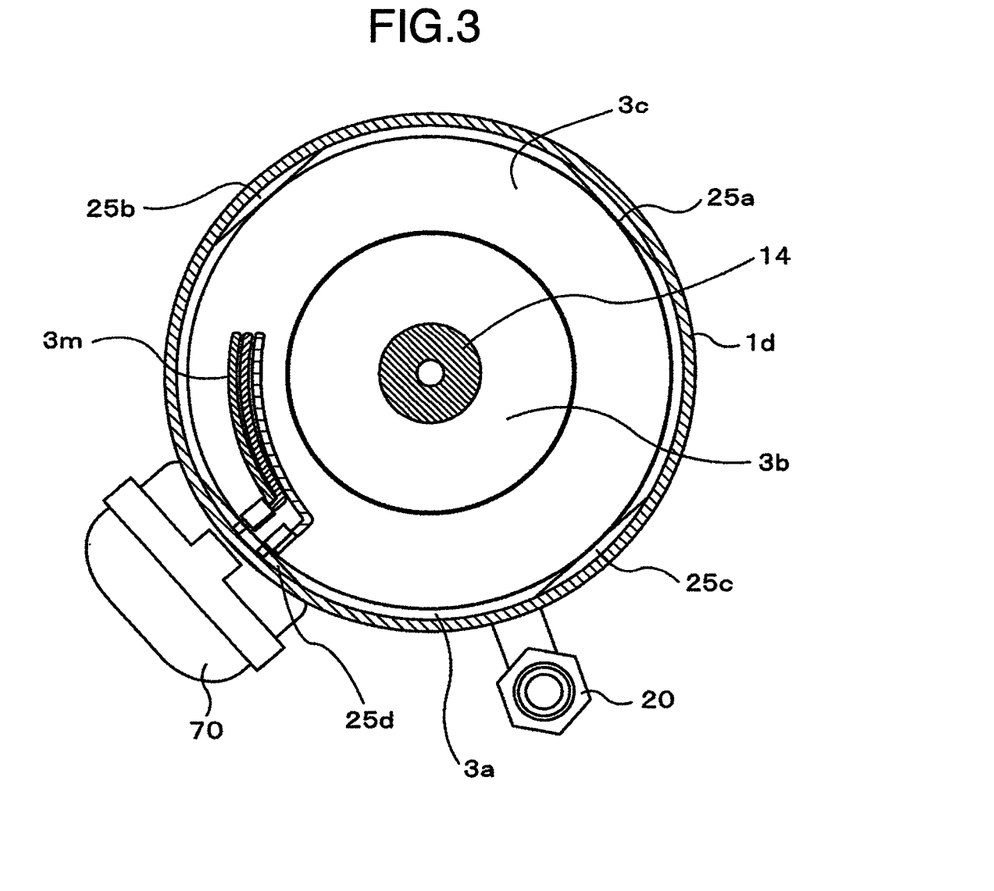
FIG. 3 is a B-B sectional view of FIG. 1.

Next, the entire configuration of the helium enclosed scroll compressor 100 will be described more concretely, referring to FIGS. 1 to 3. FIG. 2 is an A-A sectional view of FIG. 1, and FIG. 3 is a B-B sectional view of FIG. 1.

In this embodiment, as described above, a helium gas is used as a working gas, and the oil injection pipe 31 for cooling this working helium gas is connected to an oil injection port 22 provided at the panel 5a of the stationary scroll 5 through a top cover 1c of the enclosed vessel 1. Oil is injected into the compression chamber 8 during the compression of the compressor section 2 through the oil injection port 22 from the oil injection pipe 31. Additionally, the bottom of the enclosed vessel 1 is provided with an oil take-out pipe 30 which takes out lubricating oil 23 at the bottom of the vessel to the outside of the vessel.

In the compressor section 2, the stationary scroll 5 and the orbiting scroll 6 are engaged with each other to form the compression chamber 8. The stationary scroll 5 is comprised of the disk-like panel 5*a*, and the wrap 5*b* which stands upright at the panel and is formed in the shape of an involute curve or a curve approximate thereto, the central portion thereof is provided with the discharge port 10, and the outer peripheral portion thereof is provided with the suction port 15. The orbiting scroll 6 is comprised of the disk-like panel 6*a*, the wrap 6*b* which stands upright at the panel and formed in the same shape as the wrap 5*b* of the stationary scroll, and a boss 6*c* which is formed on the surface of the panel opposite the wrap.

A frame 7 partitions the inside of the enclosed vessel 1 into the discharge chamber 1*a* on the side of the compressor section 2 and the motor chamber 1*b* on the side of the motor section 3. The rectangular passage 18 is constituted by passages 18*a* and 18*b* which are formed between outer edges of the stationary scroll 5 and the frame 7 and an inner wall surface 1*m* of the enclosed vessel 1. A central portion of the frame 7 is provided with a bearing 40, and the rotary shaft 14 is borne by the bearing 40. Additionally, the frame 7 fixes the stationary scroll 5 by a plurality of bolts 81.

The eccentric shaft 14*a* which constitutes an upper end of the rotary shaft 14 is inserted into the boss 6*c* so as to allow an orbiting motion. The orbiting scroll 6 is borne on the frame 7 by an Oldham's mechanism 38 comprised of an Oldham's ring and an Oldham's key, and the orbiting scroll 6 is formed so as to orbit with respect to the stationary scroll 5 without rotating. The rotary shaft 14 is integrally connected to the motor shaft 14*b*, and is directly connected to the motor section 3.

A suction pipe 17 is connected to the suction port 15 of the stationary scroll 5 through the top cover 1*c* of the enclosed vessel 2. The discharge chamber 1*a* to which the discharge port 10 opens communicates with the motor chamber 1*b* via the passage 18 (18*a*, 18*b*) of the outer edge (outer edges of the stationary scroll 5 and the frame 7) of the compressor section 2. The motor chamber 1*b* communicates with the discharge pipe 20 passing through a casing portion 1*d* which constitutes the central portion of the enclosed vessel 1. The discharge pipe 20 is installed in a position substantially opposite the passages 18*a* and 18*b*. The positional relationship between both passages 18 and the discharge pipe 20 is such that a mixture of the working gas and injection oil which has passed through the passage 18 is divided into two including a downward flow path facing the arched passage 25*b* in the vertical direction of the passage 18, and a flow path which faces a horizontal direction by the collision with a stator upper surface or the coil end 3*c* thereabout. The horizontal flow path is branched into a flow path which faces the arched passages 25*a* and 25*d* along a vessel inner wall and a flow path which faces the discharge pipe 20 through the central portion.

Between the stator 3*a* and the inner wall surface 1*m* of the casing portion 1*d*, the motor section 3 forms the arched passage 25*b* which becomes a flow passage portion of the mixture of a working gas and injection oil, and forms the arched passages 25*a*, 25*c,* and 25*d* serving as other flow passage portions. The mixture of a working gas and injection oil becomes mainly a downward flow in the arched passage 25*b*, and only the working gas becomes an upward flow in the arched passage 25*c*. Additionally, an air gap 26 between the stator 3*a* and the rotor 3*b* also becomes a gas passage, and the motor chamber 1*b*1 and the motor chamber 1*b*2 communicate with each other via the air gap 26.

By the flow of a mixture of a working gas and injection oil of the motor chambers 1*b*1 and 1*b*2 inside such a vessel, direct cooling of the motor section 3 by the working gas including injection oil having a relatively low temperature of 60° C. to 70° C. is allowed. Additionally, the oil in the working gas is separated from the working gas in the motor chambers 1*b*1 and 1*b*2, flows downward, and is stored at the bottom of the enclosed vessel 1.

A hermetic terminal 70 is attached to the enclosed vessel 1, and supplies electric power to the motor section 3 via a motor lead wire 3*m*.

In addition, an O ring 53 which seals a high-pressure portion and a low-pressure portion is provided between the suction pipe 17 and the stationary scroll 5. Additionally, check valve means 13 is provided within the suction pipe 17. The check valve 13 is provided to prevent reverse rotation of the rotary shaft 14 when the compressor is stopped and to prevent the lubricating oil 23 within the enclosed vessel 1 from flowing out to the low-pressure side.

Additionally, a back surface of the panel 6*a* of the orbiting scroll 6 is provided with a space 36 (hereinafter referred to as a backpressure chamber) surrounded by the compressor section 2 and the frame 7. An intermediate pressure Pb between a suction pressure Ps and a discharge pressure Pd is introduced into the backpressure chamber 36 via pores 6*d* which are perforated in the panel 6*a* of the orbiting scroll 6, thereby applying an axial application force which presses the orbiting scroll 6 against the stationary scroll 5.

The lubricating oil 23 is reserved at the bottom of the enclosed vessel 1. The lubricating oil 23 is sucked up by the differential pressure between the high pressure within the enclosed vessel 1 and the intermediate pressure Pb of the backpressure chamber 36 to an oil suction upper pipe 27, flows through the inside of the rotary shaft 14, and is fed to a main bearing 40 and an auxiliary bearing 39 via the turning bearing 32 and a transverse hole 51. The oil fed to the main bearing 40 and the auxiliary bearing 39 passes through the backpressure chamber 36, is injected into the compression chamber 8 of the scroll wrap via the pores 6*d*, mixed with compressed gas, and discharged to the discharge chamber 1*a* along with the helium gas.

Next, a lubrication system by the oil injection of the helium enclosed scroll compressor 100 will be described more concretely, referring to FIG. 1.

The lubricating oil 23 reserved at the bottom of the enclosed vessel 1 flows into the oil take-out pipe 30 from an inflow portion 30*a* of the oil take-out pipe 30 by the differential pressure between the pressure (discharge pressure Pd) within the enclosed vessel 1 and the pressure (pressure lower than the discharge pressure Pd) of the compression chamber 8. The oil which has flowed into the inflow portion 30*a* of the oil take-out pipe 30 reaches an oil cooler 33 through an external oil pipe 51, and is appropriately cooled here. Then, the oil passes through the oil injection pipe 31 and the port 22 via oil pipe 51, and is injected into the compression chamber 8 by utilizing the differential pressure. In addition, in FIG. 1, reference numeral 271 represents an oil flow rate control valve.

The oil injected into the compression chamber 8 in this manner functions to cool the working gas and lubricate sliding portions, such as the tip of the scroll wrap, within the compression chamber 8. Also, the oil supplied to the compression chamber 8 from the lubrication system by oil injection and the oil fed to the compression chamber 8 through the main bearing 40 and the auxiliary bearing 39 are discharged to the discharge chamber 1*a* from the discharge port 10 along with the working gas, and becomes the flow of a mixed fluid of the helium gas and a mist-like oil. This mixed fluid moves to the motor chamber 1*b* via the rectangular passages 18*a* and 18b. As a result, as mentioned above, the mixed fluid is separated from the working gas in the motor chamber 1b, flows down via the arched passage 25 and the like, and is reserved at the bottom of the enclosed vessel 2.

Figure 4:
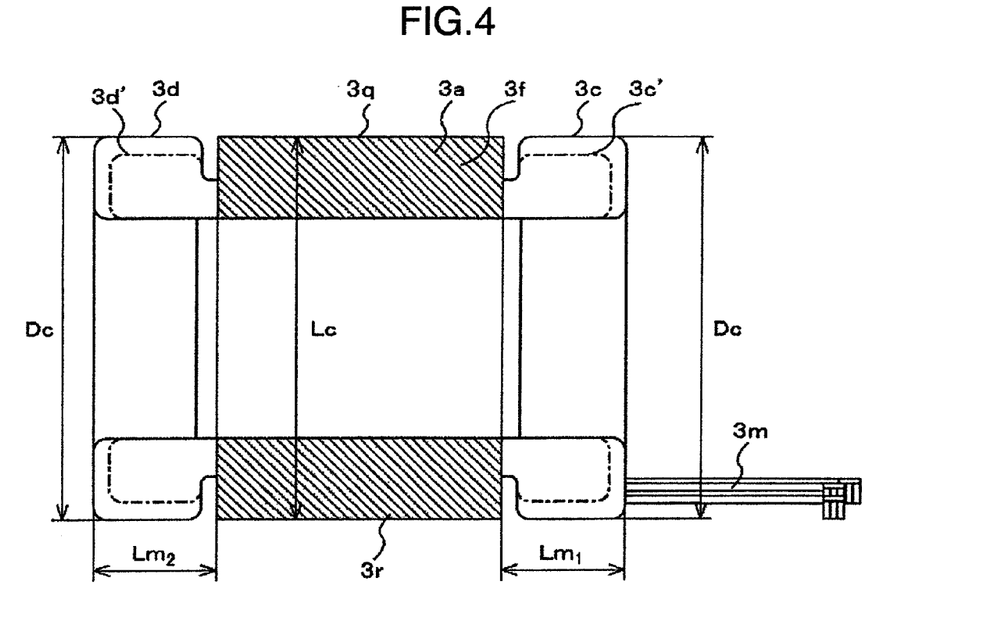
FIG. 4 is a sectional view in a state where a stator used for a motor section of FIG. 1 is arranged transversely.
Figure 6:
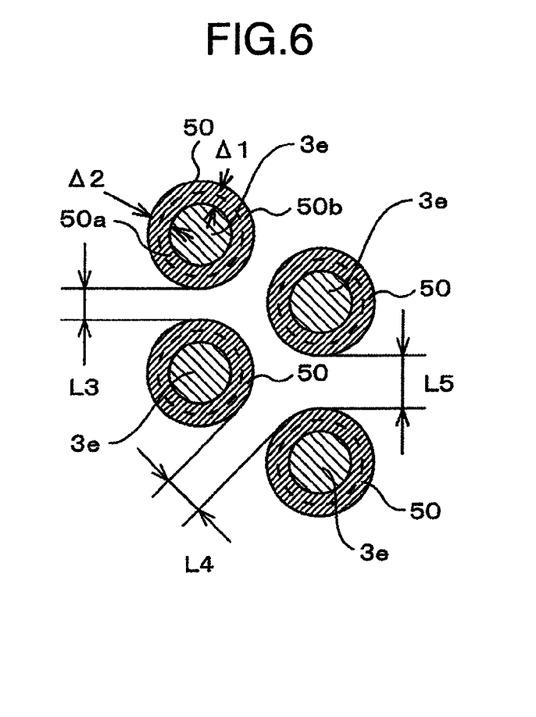
FIG. 6 is an enlarged cross-sectional view of a coil portion in coil ends of this embodiment of FIG. 4.
Figure 7:
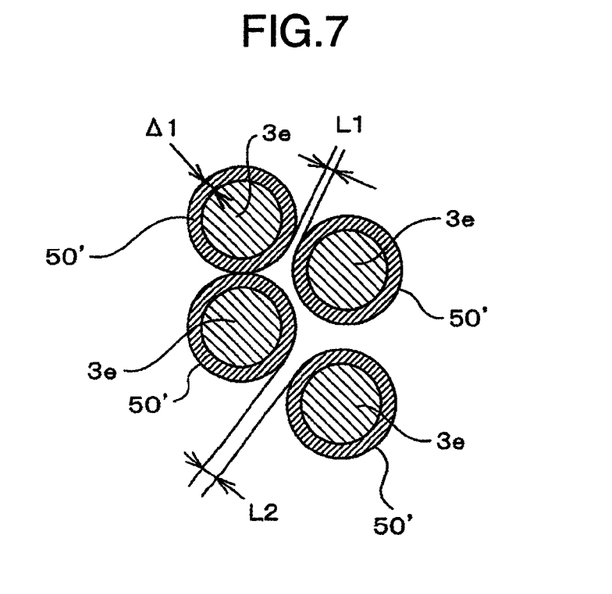
FIG. 7 is an enlarged cross-sectional view of a coil portion in coil ends of a conventional example of FIG. 4.

Next, the coil ends 3c and 3d of the motor section 3 will be described more concretely, referring to FIG. 1 and FIGS. 4 to 7. FIG. 4 is a sectional view in a state wherein the stator 3a used for the motor section 3 of FIG. 1 is arranged transversely, FIG. 5 is a plan view of the stator 3a used for the motor section 3 of FIG. 1, FIG. 6 is a enlarged cross-sectional view of a coil portion in the coil ends 3c and 3d of this embodiment of FIG. 4, and FIG. 7 is an enlarged cross-sectional views of a coil portion in coil ends 3c' and 3d' of a conventional example of FIG. 4.

Figure 5:
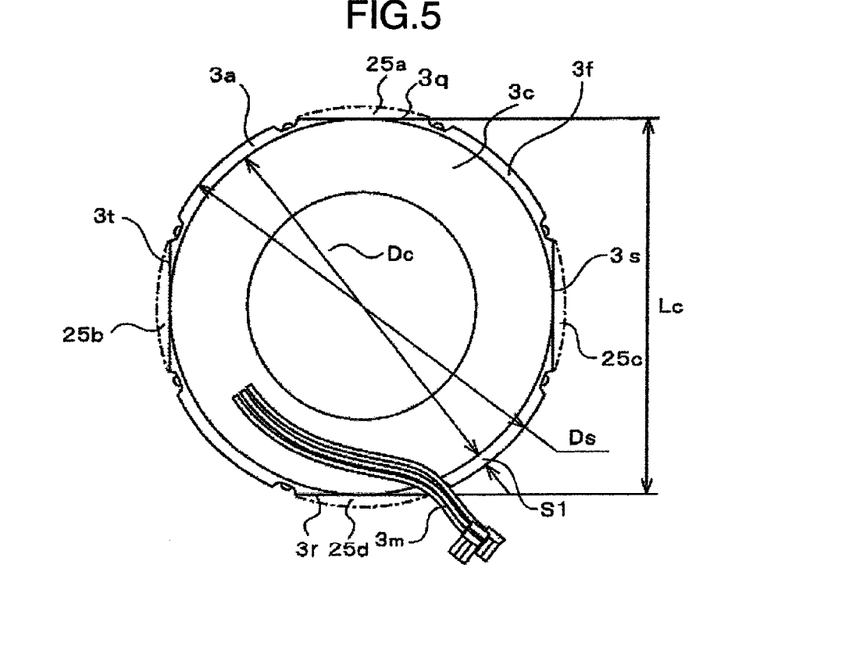
FIG. 5 is a plan view of the stator used for the motor section of FIG. 1.

The coil ends 3c and 3d indicated by solid lines of FIGS. 4 and 5 are formed to have greater external diameter Dc and height Lm1 and Lm2 and are formed to have greater coil density, than the coil ends 3c' and 3d' indicated by one-dotted chain lines of the conventional example. This makes it possible to reduce the amount of coil shaping in electric work during coil shaping compared with the conventional example, and makes it possible to suppress generation of any damage of coils during electric work. Accordingly, generation of corona discharge resulting from the generation of the coil damage can be suppressed.

In addition, in this embodiment, a height Lm1 of the coil end 3c is made equal to a height Lm2 of the coil end 3d. Additionally, it is practically appropriate that the relationship between a stator external diameter Ds and heights Lm1 and Lm2 is Lm1/Ds=Lm2/Ds=0.26 to 0.30.

Additionally, the coil ends 3c and 3d are expanded to an external diameter Dc almost equal to an external diameter Lc of the stator core 3f in the core cut portions 3q to 3t. This makes it possible to reduce the amount of coil shaping while securing the passage area of the arched passages 25a to 25d.

Furthermore, as shown in FIG. 1, the external diameters of the coil ends 3c and 3d are enlarged such that a gap dimension S1 between the outer periphery of the coil ends 3c or 3d and the inner wall surface 1m of the enclosed vessel 1 becomes smaller than a height H1 of the opening of the rectangular passage 18b. Thereby, a mixture of oil and a helium gas which flows down from the opening of the rectangular passage 18b directly collides with the upper surface of the coil end 3c. As a result, oil separation performance within the enclosed vessel 1 can be improved, and so-called amount of rise of oil which flows out to the outside from the enclosed vessel 1 can be reduced markedly. In particular, since collision separation performance is exhibited easily under an overload pressure condition in which gas flow rate becomes the greatest, the amount of rise of oil can be further reduced. The helium enclosed compressor is used for a cryopump device mainly used for a semiconductor manufacturing apparatus. In this case, by virtue of the reduction of the amount of rise of oil, the lifespan of an oil adsorber to be loaded on a helium compressor unit extends, an effect is also exerted on the long lifespan of the maintenance time of the helium compressor unit and the reduction of maintenance cost, and an effect inherent in the helium enclosed compressor is obtained.

Moreover, as shown in FIG. 6, a plurality of varnish-treated layers 50 which becomes insulating films is formed on the surface of a coil 3e which constitutes the coil ends 3c and 3d of this embodiment. As the varnish coating material of the varnish-treated layers 50, a high epoxy-based varnish material having an electrical insulating property is used. The plurality of varnish-treated layers 50 is comprised of a first varnish-treated layer 50a and a second varnish-treated layer 50b which are formed by carrying out varnish treatment multiple times (two times in the illustrated example). This varnish treatment is performed by immersing and taking out the coil ends 3c and 3d in/from a varnish tank and by repeating this multiple times. In contrast, as shown in FIG. 7, a single varnish-treated layer 50' which becomes an insulating film is formed on the surface of the coil 3e which constitutes the coil ends 3c' and 3d' of the conventional example.

In this embodiment, in order to form the plurality of varnish-treated layers 50, the Dc/Ds value which becomes the ratio of an external diameter Dc of the upper or lower coil end 3c or 3d of the motor section 3 and the external diameter Ds of the stator 3a is set to about 0.95, and the density of the coil 3e is made larger than that of the conventional example. The density of the coil 3e is roughly expressed by coil cross-sectional area/whole occupying area. As this value becomes larger, the gap between the coils 3e becomes small, and the possibility that the coil 3e contact each other increases. When the coils 3e contact each other, this becomes a factor that any damage to the coil 3e is caused. The density of the coil 3e of the conventional example is about 50%, whereas the density of the coil 3e of this embodiment is about 40%, and is reduced by about twenty percent in terms of ratio. Even from this point, in this embodiment, generation of any coil damage during electric work can be suppressed, and generation of corona discharge resulting from the generation of the coil damage can be suppressed.

As the coils 3e of the coil ends 3c and 3d of this embodiment of the coil ends 3c' and 3d' of the conventional example, enamel-coated (polyester-based film insulating material) electric wires are used. The first varnish-treated layer 50a and varnish-treated layer 50' with a thickness Δ1 are formed on the surfaces of the coils 3e by immersing the enamel-coated coils 3e in a varnish tank to perform first varnish treatment. This thickness Δ1 is, for example, about several micrometers. Only in forming the first varnish-treated layer 50a and varnish-treated layer 50' by the first varnish treatment, a non-varnish-treated portion or a very thin varnish-treated portion which has not covered the coil 3e may be generated partially, which causes generation of corona discharge. Particularly, in a case where a minute pinhole (bus exposed portion) exists in the enamel coating of the surface of the coil 3e, corona discharge occurs easily when the pinhole and the non-varnish-treated portion or the very thin varnish-treated portion overlap each other.

Thus, in this embodiment, the plurality of varnish-treated layers 50 with a thickness Δ2 is formed on the surface of the coil 3e by immersing the coil ends 3c and 3d in which the first varnish-treated layer 50a has been formed to perform second varnish treatment. The plurality of varnish-treated layers 50 is comprised of the first varnish-treated layer 50a and the second varnish-treated layer 50b. The thickness Δ2 becomes an insulating film thickness of about twice the thickness Δ1 of the varnish-treated layer 50' of the conventional example. Since the second varnish-treated layer 50b is formed so as to cover the non-varnish-treated portion or very thin varnish-treated portion in the first varnish-treated layers 50a, generation of corona discharge can be prevented. Additionally, gaps L3 to L5 between the coils 3e become wider than gaps L1 to L2 of the conventional example by increasing the density of the coil 3e, and a varnish material permeates easily during varnish treatment. As a result, even when there is a minute pinhole formed in the surface of the coil 3e, the minute pinhole portion can be covered reliably, and the insulating property as the whole motor can be improved remarkably.

When the plurality of varnish-treated layers 50 is formed on the surface of the coil 3e of the coil end 3c or 3d, the heat-radiating characteristic from this portion deteriorates.

Thus, in this embodiment, as described above, measures are taken, such as achieving motor cooling by oil injection, promoting the cooling effect of oil to the coil 3e as the mixture of the oil and a helium gas which flows down from the rectangular passage 18b directly collides with the upper surface of the coil end 3c, and increasing the density of the coil 3e, thereby facilitating permeation of oil to between the coils 3e to promote the cooling effect of oil to the coil 3e. Thereby, even under severe testing conditions, such as an overload condition, the temperature rise of the coil ends 3c and 3d can be prevented, and lowering of the motor lifespan and degradation of reliability by motor burnout can be prevented.

(Second Embodiment)

Figure 8:
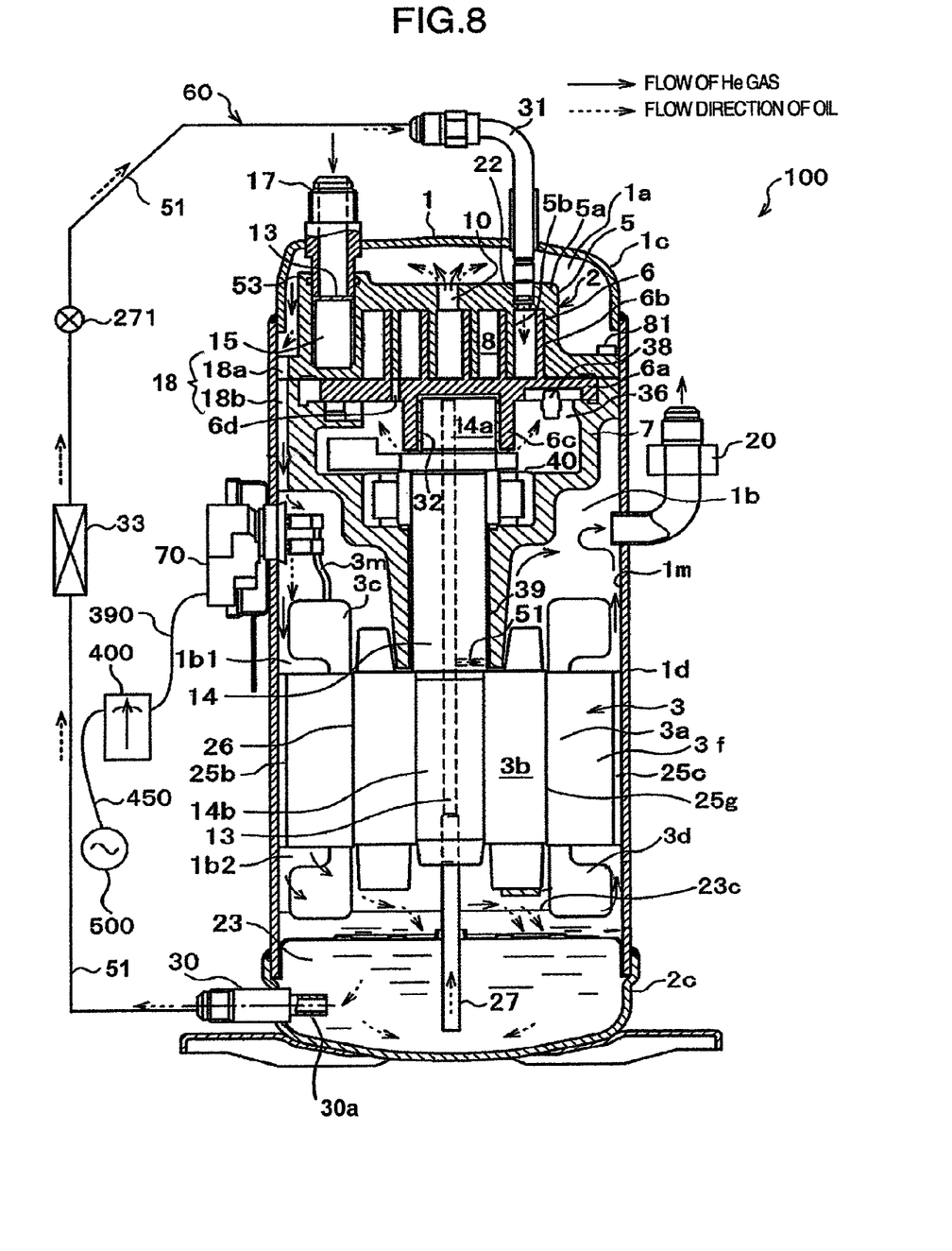
FIG. 8 is a longitudinal sectional view of a helium enclosed scroll compressor of a second embodiment of the invention.
Figure 9:
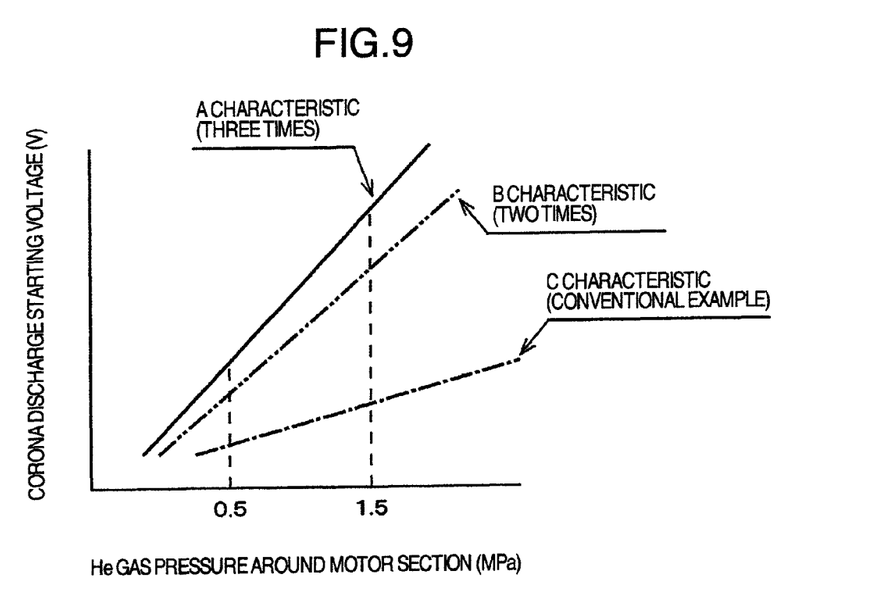
FIG. 9 is a graph illustrating respective corona starting voltage characteristics of a plurality of varnish-treated layers of the second embodiment and a single varnish-treated layer of the conventional example.
Figure 10:
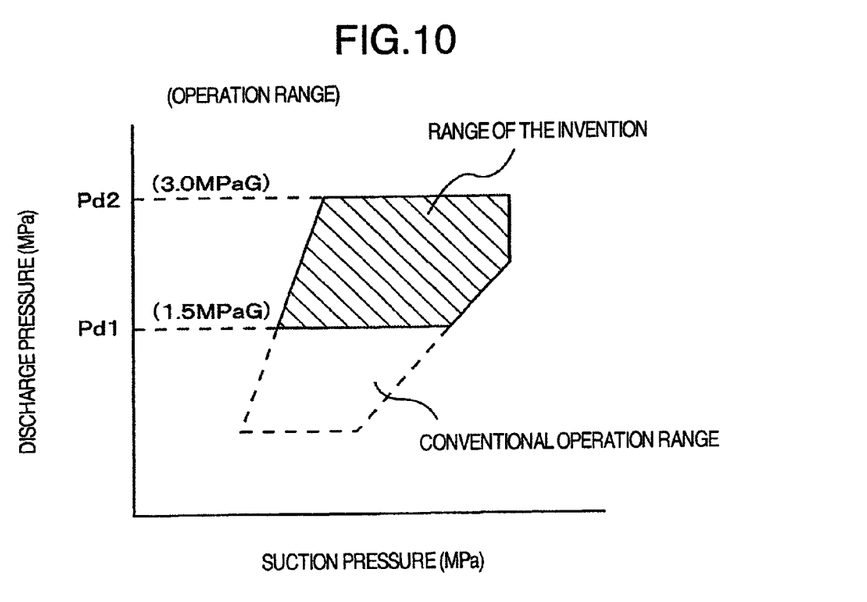
FIG. 10 is a graph illustrating respective operation ranges of the second embodiment and the conventional example.

Next, a second embodiment will be described with reference to FIGS. 8 to 10. FIG. 8 is a longitudinal sectional view of a helium enclosed scroll compressor 100 of the second embodiment of the invention, FIG. 9 is a graph showing respective corona starting voltage characteristics of the plurality of varnish-treated layers of the second embodiment and a single varnish-treated layer of the conventional example, and FIG. 10 is a graph showing respective operation ranges of the second embodiment and the conventional example. Since this second embodiment is different from the first embodiment in points to be described below, and is basically the same as the first embodiment in other points, redundant description is omitted.

This second embodiment is an example of an enclosed helium scroll compressor to be driven by an inverter 400. In this second embodiment, the hermetic terminal 70 which is connected to the motor section 3 via the motor lead wire 3m is installed in the casing portion 2b (having cover 2c) of the enclosed vessel 1. This hermetic terminal 70 is supplied with a commercial power supply voltage through a wiring line 450, the inverter 400, and a wiring line 390 from a commercial power supply 500.

For example, in the commercial power supply 480 V of U.S. areas or the like, the surge voltage to be generated by inverter driving is the greatest, and the high voltage of 2×480× √2=about 1400 V acts on the hermetic terminal 70, and between the coils 3e of the coil end 3c or 3d. Even if a high surge voltage acts on between the coils 3e of the coil end 3c or 3d, similarly to the first embodiment, the film thickness of a varnish insulating material is set to be multiple times the thickness in the conventional one-time varnish treatment, and even if a pin hole or the like is interposed in an enameled wire of a coil portion, coating of a varnish insulating material is performed reliably. Thereby, the insulation breakdown effect by corona discharge can be prevented, and short-circuiting by any damage of the coil 3e can be prevented.

In this embodiment, the operating pressure within the enclosed vessel is set to a range of 1.5 MPaG to 3.0 MPaG by the inverter 400. This makes it possible to reliably prevent generation of corona discharge.

This will be described concretely with reference to FIGS. 9 and 10. FIG. 9 shows the relationship between the atmospheric pressure of a helium gas and the corona discharge starting voltage. A C characteristic curve shows the conventional example in which varnish treatment was performed once, a B characteristic curve shows the second embodiment in which varnish treatment was performed twice, and an A characteristic curve shows a case in which varnish treatment was performed three times. As such, it turned out that the corona discharge starting voltage has a great influence on an atmospheric pressure along with the influence of the number of times of varnish treatment, and it also turned out that a very high corona discharge starting voltage can be obtained by performing a plurality of layers of varnish treatment and by setting the pressure (that is, the pressure within the enclosed vessel 1) of a helium gas around the motor section 3 to 1.5 MPaG. From this result, in the helium scroll compressor which performs inverter control, as shown in FIG. 10, the motor insulating property breakdown by a surge voltage generated by inverter driving can be reliably prevented if the pressure within the vessel under operation is set to 1.5 MPaG or more. In addition, the upper limit 3.0 MPaG is a constraint on the strength of the enclosed vessel 1.

The lubricating oil 23 is reserved at the bottom of the enclosed vessel 1, and the height Lm2 of the lower coil end 3d is increased so that the lower end of the coil end 3d is soaked in an oil surface 23c. This makes it possible to more reliably cool the motor section 3.

According to the first and second embodiments described above, the helium enclosed compressor for constant speed and for inverter driving has the following effects.

(1) By forming a plurality of varnish-treated layers which becomes insulating films on the surface of a coil which constitutes coil ends, it is possible to set the film thickness of a varnish insulating material to be several times larger than a conventional one, and the insulation deterioration and insulation breakdown of the coil ends caused by corona discharge can be prevented.

(2) Even if a defective portion, such as a pinhole portion or coil damage, is interposed in the surface of the motor coil end, the above varnish insulating material permeates easily, and the varnish-treated layer can cover the defective portion completely. For this reason, a motor insulating property can be improved remarkably, and motor burnout can be prevented in advance.

(3) By relaxing the geometry of the motor coil end, any damage to the whole coil portion during shaping of the coil end can be reduced, and generation of coil damage can be suppressed. For this reason, a motor insulating property is improved and the reliability of a motor can be improved.

(4) Since the function of the motor coil end as a demister for oil separation is improved, the oil separation efficiency of the vessel itself of the compressor is improved, and the amount of rise of oil of the compressor can be reduced.

The invention claimed is:

1. A helium enclosed compressor in which
a helium gas is used as a working gas,
a compressor section, and a motor section including a stator having coil ends and a rotor are housed within an enclosed vessel,
the inside of the enclosed vessel is partitioned into a discharge chamber and a motor chamber by a frame,
the compressor section is adapted such that a stationary scroll having a spiral wrap standing upright at a first disk-like panel and an orbiting scroll having a spiral wrap standing upright at a second disk-like panel are made to mesh with each other while their wraps face the inside, and the orbiting scroll is made to orbit, thereby sucking the helium gas from a suction port of an outer peripheral portion of the stationary scroll, and discharging the helium gas into the discharge chamber from a discharge port of a central portion of the stationary scroll, and
an inverter is provided to control the number of rotations of the motor section,
wherein a plurality of varnish-treated layers which becomes insulatins films is formed on the surface of a coil which constitutes the coil ends, and
a relationship between a stator external diameter and axial heights of the coil ends is Lm1/Ds=Lm2/Ds=0.26 to 0.30, when Ds is the stator external diameter, Lm1 is the axial height of one of the coil ends, and Lm2 is the axial height of the other one of the coil ends.

2. The helium enclosed compressor according to claim 1, wherein the operating pressure within the enclosed vessel is set to a range of 1.5 MPaG to 3.0 MPaG.

3. The helium enclosed compressor according to claim 1, wherein the stator has a stator core and the coil ends which protrude on both sides of the stator core, a core cut portion is formed in the outer peripheral surface of the stator core so that a passage which allows an upper portion and a lower portion of the stator core to communicate with each other is provided between an outer peripheral surface of the stator core and the inner wall surface of the enclosed vessel.

\* \* \* \* \*